(12) United States Patent
Henck

(10) Patent No.: US 9,789,846 B2
(45) Date of Patent: Oct. 17, 2017

(54) PYROTECHNIC ACTUATOR

(71) Applicant: TK Holdings Inc., Armada, MI (US)

(72) Inventor: Jeremy M. Henck, White Lake, MI (US)

(73) Assignee: TK Holdings Inc., Auburn Hills, MI (US)

( * ) Notice: Subject to any disclaimer, the term of this patent is extended or adjusted under 35 U.S.C. 154(b) by 338 days.

(21) Appl. No.: 14/503,030

(22) Filed: Sep. 30, 2014

(65) Prior Publication Data

US 2015/0090111 A1    Apr. 2, 2015

Related U.S. Application Data

(60) Provisional application No. 61/884,967, filed on Sep. 30, 2013.

(51) Int. Cl.

| F15B 15/14 | (2006.01) |
| B60R 21/38 | (2011.01) |
| F15B 15/19 | (2006.01) |
| F15B 15/22 | (2006.01) |

(52) U.S. Cl.
CPC .............. B60R 21/38 (2013.01); F15B 15/19 (2013.01); F15B 15/148 (2013.01); F15B 15/1457 (2013.01); F15B 15/22 (2013.01)

(58) Field of Classification Search
CPC ......... F15B 15/148; F15B 15/19; F15B 15/22
See application file for complete search history.

(56) References Cited

U.S. PATENT DOCUMENTS

| 2,354,889 A * | 8/1944 | Smith ................. F15B 15/1447 188/276 |
| 3,382,772 A * | 5/1968 | Kampert ............. F15B 15/1447 92/247 |
| 4,988,081 A | 1/1991 | Dohrmann |
| 5,704,273 A * | 1/1998 | Reeder ................. B60T 17/085 188/170 |
| 7,374,008 B1 | 5/2008 | Neal et al. |
| 2004/0007123 A1 | 1/2004 | Ritchie et al. |
| 2007/0271922 A1 | 11/2007 | Travis |

FOREIGN PATENT DOCUMENTS

| EP | 10090819 A1 | 4/2001 |
| GB | 2395693 | 2/2004 |
| WO | WO 00/75602 | 12/2000 |
| WO | WO 2009156666 | 12/2009 |

OTHER PUBLICATIONS

English Translation of Chinese Office Action issued in corresponding CN Application 201480053845.5, dated Jun. 27, 2017.

* cited by examiner

*Primary Examiner* — F. Daniel Lopez
(74) *Attorney, Agent, or Firm* — Meunier Carlin & Curfman LLC

(57) ABSTRACT

A novel actuator contains a housing having a first end, a second end, and an inner wall. A piston rod assembly is contained within the housing, wherein the assembly contains a piston rod, a first end cap fixed at one end of the piston rod, and a second end cap fixed at an opposing end of the piston rod. An energy management device is constrained about an outer diameter of the first end cap, wherein upon actuation of the actuator, the energy management device may under predetermined conditions be deformed upon movement of said piston rod.

11 Claims, 3 Drawing Sheets

PYROTECHNIC ACTUATOR

CROSS-REFERENCE TO RELATED APPLICATIONS

This application claims the benefit of U.S. Provisional Application Ser. No. 61/884,967 filed on Sep. 30, 2013.

TECHNICAL FIELD

The present invention relates generally to an improved linear actuator that may be used to elevate an automotive hood or bonnet upon a pedestrian impact with the front of the vehicle.

BACKGROUND OF THE INVENTION

The present invention relates to vehicle occupant protection systems or other safety systems employing linear actuators to elevate a vehicle surface such as a hood, in the event of collision or impact with a pedestrian. Exemplary linear actuators typically employ pyrotechnic means to activate a piston within an actuator. With regard to certain events, such as a bonfire event, or with regard to bonfire testing or mounted dry fire testing, the energy created at that time must be managed. Stated another way, in certain environments, pyrotechnic actuators may be activated under "no-load" conditions wherein an associated piston rod may be essentially unrestrained in the absence of a load from a hood of a vehicle or other load for example. When assembling various constituents of typical pyrotechnic actuators together, stress risers caused by manufacturing processes such as crimping, welding, press-fitting, or any other suitable assembly process may be an area(s) of weakness when exposed to physical shock upon actuation of the actuator. It would be an improvement to provide an improvement to the typical pyrotechnically actuated pistons, one that facilitates management of the energy attendant to a bonfire event for example.

SUMMARY OF THE INVENTION

The above-referenced concerns and others are reconciled by an actuator containing a housing having a first end, a second end, and a first housing inner wall. A piston rod assembly is contained within the housing wherein the piston rod assembly contains a piston rod having a piston rod third end proximate to the housing first end, a piston rod fourth end proximate to the housing second end, and a second or piston rod inner wall. A first piston end cap is fixed within the third end and includes an end cap outer wall. A second piston end cap may be fixed within the fourth end and also includes an end cap outer wall. The first piston end outer wall has a first portion with a relatively greater outer diameter, and a second intermediate portion with a relatively smaller outer diameter as compared to the outer diameter of the first portion, wherein the second portion is slidably engageable with the inner diameter of the second or piston rod inner wall. A plenum may be formed between the second portion outer diameter and the piston rod inner wall, and between a crimp formed from crimping the piston rod to the first piston end cap and a third portion. A crushable sleeve or energy management device may be positioned in the plenum, or about the second portion and within the second or piston rod inner wall, wherein upon actuation of the actuator, the resultant movement of the piston rod crushes the sleeve or stated another way, deforms the energy management device. Notably, if the actuator is under a load, such as the hood of the vehicle, the sleeve would not crush primarily because the piston rod would not extend to its full non-load potential.

DETAILED DESCRIPTION OF THE INVENTION

Figure 1:
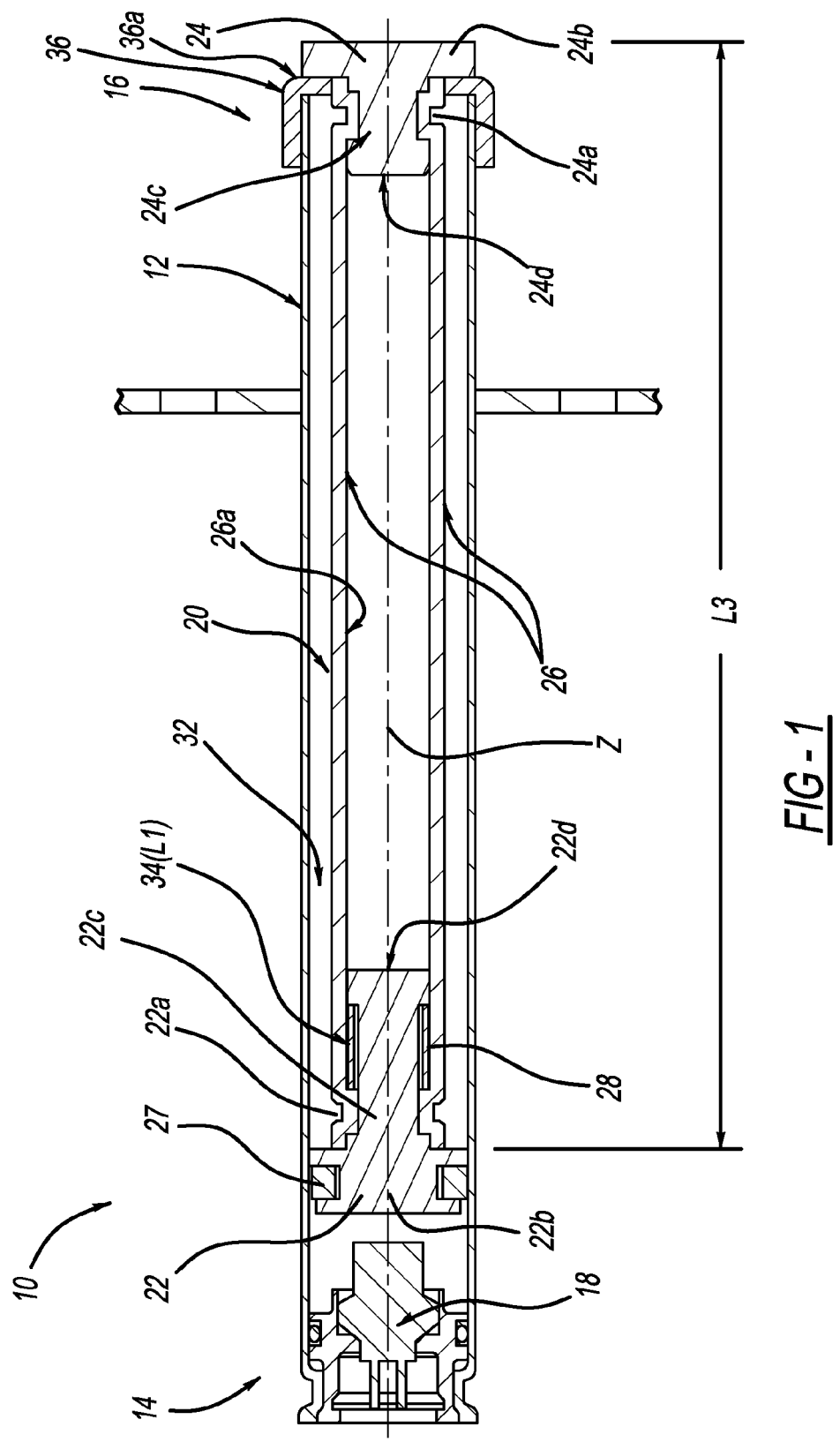
FIG. 1 is a cross-sectional view of an actuator in a pre-actuation state, in accordance with the invention, wherein the view is taken along the length of the actuator.

As shown in the Figures, a linear actuator 10 contains a housing 12. The housing 12 contains a first end 14 and a second end 16. An initiator or igniter 18 is fitted within the first end 14 and seals the first end 14 in a known manner. A piston or piston rod assembly 20 is positioned adjacent the igniter 18 prior to actuation of the actuator 10, wherein the piston 20 contains a first end 22 and a second end 24. A piston rod 26 connects the first piston end 22 with the second piston end 24. As shown in the figures, a first crimp 22a fixes the piston rod 26 to piston end 22. As indicated above, the first crimp 22a exemplifies any similar stress riser caused by manufacturing process such as welding, crimping, press-fitting and so forth. As shown in the drawings, the piston end 22 has a first portion 22b (proximate to the igniter 18) having a relatively wider diameter, and a third opposite portion 22d having a relatively smaller diameter. A second or intermediate portion 22c of piston end 22 has an even relatively smaller outer diameter as compared to first portion 22b and third portion 22d. A seal 27 is fixed about the wider portion 22b of the piston end 22 thereby preventing blow-by of the ignition products into an annular region 32 defined between the housing 12 and the piston rod 26. As a result, the piston efficacy is assured.

In accordance with the present invention, an energy management device such as a crushable sleeve 34 is positioned about the second or narrower intermediate portion 22c, thereby covering at least part of the portion 22c. As the piston rod 26 is crimped about the piston intermediate or second portion 22c to form crimp 22a, the sleeve 34 is preferably slidably and/or loosely retained about the outer diameter of second portion 22c, thereby permitting the slidable movement of the piston rod 26 along portion 22c. A stop portion 22d is formed at an end of the piston end 22 and constrains the crushable sleeve 34 to a position located about portion 22c, between crimp 22a and portion 22d. As shown in FIG. 1, the crimp 22a attaches the piston rod about the outer diameter of narrower portion 22c thereby constraining the movement of sleeve 34 along a longitudinal axis Z. As also shown in FIG. 1, a plenum 28 may be formed between the outer diameter of portion 22c, the crimp 22a, third portion 22d, and the inner wall 26a of the piston rod 26. Accordingly, sleeve 34 may then reside within the plenum 28 prior to actuation of the actuator 10.

As with piston end 22, the piston end 24 has a third portion 24b having a relatively wider diameter and a fourth portion 24d having a relatively smaller diameter. As the piston rod 26 is crimped about the piston portion 24c to form crimp 24a, the piston end 24 is secured to the rod 26. An annular collar 36 is welded or otherwise fixed about the exterior of the housing 12 and a portion thereof 36a radially and inwardly extends adjacent to piston end 24 and thereby positions and constrains the housing 12 and the piston rod 26 also adjacent to the second piston end 24. The annular collar 36 also provides a stop for the piston rod 20 when first end 22 collides with the annular collar 36 upon activation of the actuator 10.

As shown in FIG. 1, the actuator 10 is illustrated in a pre-activated state. Notably, the crush sleeve 34 is represented with a certain length L1 prior to activation of the actuator 10. Furthermore, the piston rod 26 is completely encased within the housing 12. The piston end 24 is preferably flushly seated against the second end 16 of the housing 12 until piston 20 is propelled forward by ignition forces from igniter 18, upon activation of the actuator 10.

Figure 2:
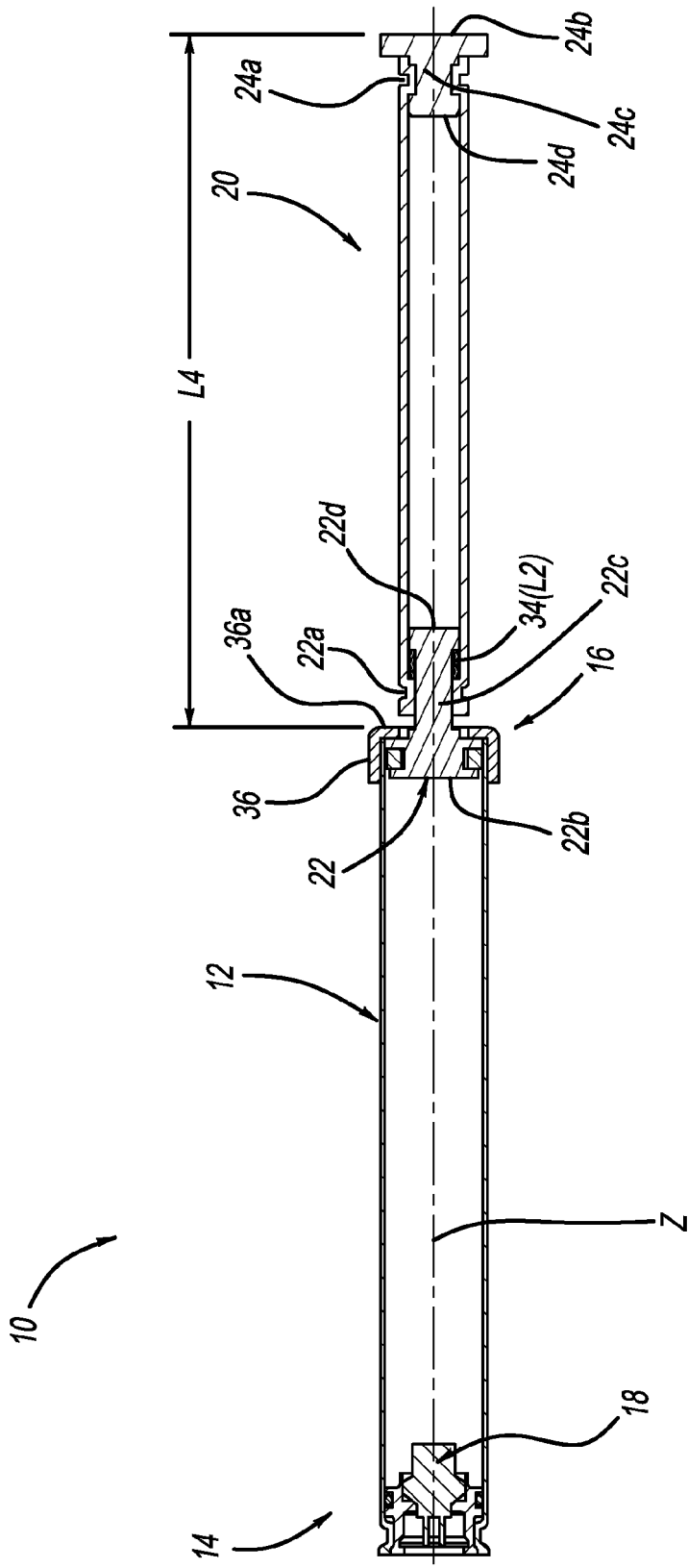
FIG. 2 is a cross-sectional view of an actuator in a non-load post-actuation state, in accordance with the invention, wherein the view is taken along the length of the actuator.

As shown in FIG. 2, the actuator 10 is illustrated in a non-load activated state. The term "non-load" is meant to convey a condition where the actuator 10 is activated without any load such as the weight of the hood and perhaps the weight of a pedestrian. In essence, the use of the crush sleeve 34 provides a safety dampening mechanism for those events or predetermined conditions wherein the actuator may be activated without a load. Notably, the crush sleeve 34 is represented with a shortened length L2 whereby the sleeve 34 is compressed as the piston rod 26 traverses through housing 12 and out of end 16. As also shown, upon activation of actuator 10, the piston rod 26 has slidably traversed along portion 22c as the sleeve 34 is compressed to manage the energy of the piston rod 26 as it is propelled through and out of housing 12.

Figure 3:
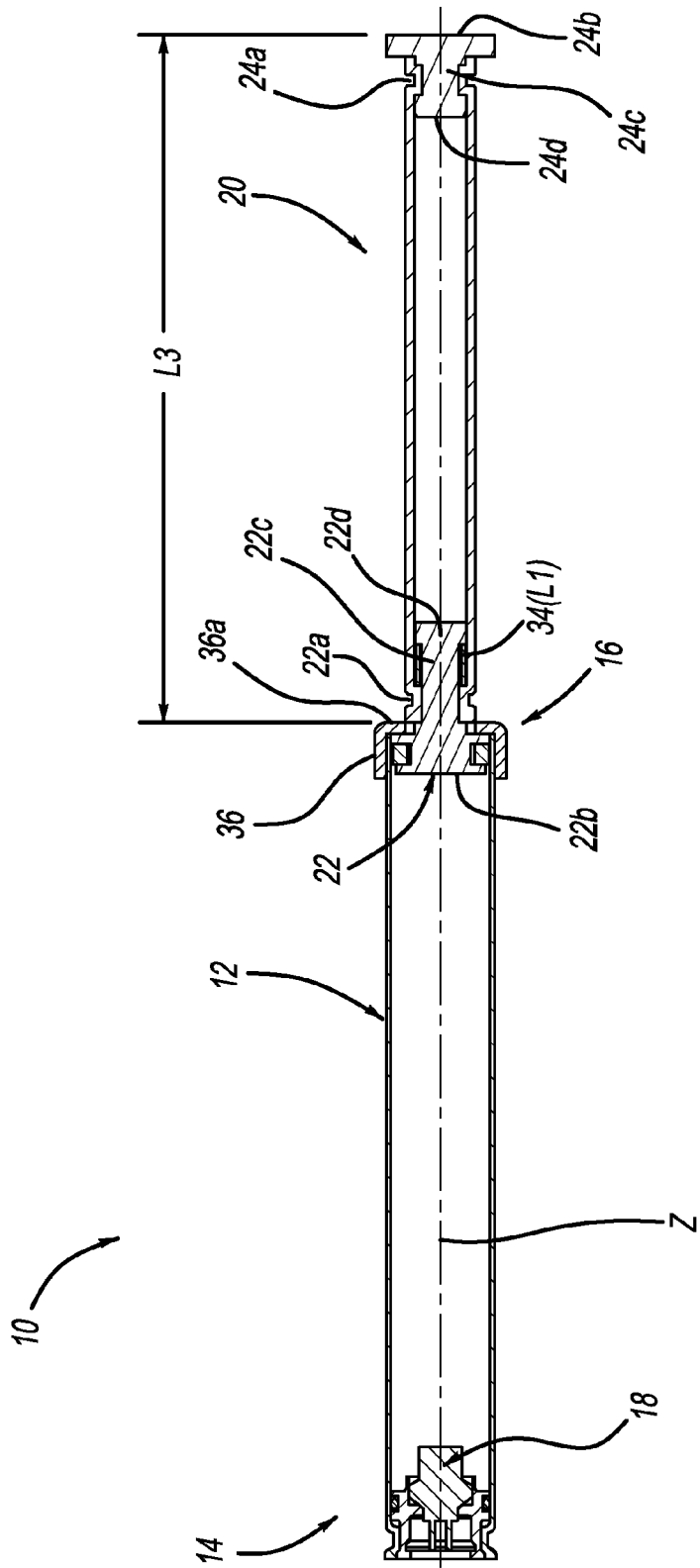
FIG. 3 is a cross-sectional view of an actuator in a post actuation state under a load, wherein the view is taken along the length of the actuator.

As shown in FIG. 3, on the other hand, the actuator 10 is illustrated under a load in an activated state. The term "load" is meant to convey a condition where the actuator 10 is activated with the weight of the hood and perhaps the weight of a pedestrian as a load. In this "loaded" state, it can be seen that the crush sleeve 34 is essentially not crushed because the dampening mechanism is in fact the load that would occur when the actuator 10 is activated under normal operating conditions wherein a load is exerted against the movement of the piston rod 26 at some point as it slidably traverses through the housing 12. Accordingly, the crush sleeve 34 would not typically function as a dampener during normal "load" conditions of an activated actuator 10, such as when collision between a pedestrian and the vehicle is imminently indicated.

In operation, the present linear actuator 10 is activated when the igniter 18 receives a signal from a vehicle computer algorithm that responds to impact, deceleration, or other known appropriate sensor. As the pedestrian makes contact with the associated vehicle and/or vehicle hood, the algorithm senses the impact and signals the igniter 18 to activate. Upon activation, heat and pressure products from the igniter 18 propel the piston 20 forward or upward across the length of the body 12 to the second end 16. As the piston 20 is propelled within and across the length of the housing 12, the second piston end 24, and piston portion 24b, larger in diameter than the rest of the piston end 24, functions to elevate or raise the hood to mitigate the harm or injury to the pedestrian in contact therewith.

It will be appreciated that the present actuator may be largely formed or manufactured as known in the art. For example, U.S. Pat. No. 6,568,184 exemplifies a pyrotechnic actuator and generally teaches the basic structure of the present invention, and is herein incorporated by reference in its entirety. Alternatively, U.S. Pat. No. 8,656,716 also incorporated by reference in its entirety exemplifies a hybrid (that is pyrotechnic and pressurized actuator) or a pressurized gas actuator (one containing a store of pressurized gas). The various constituents such as the housing and piston rod may be drawn or extruded, or otherwise formed as known in the art. The various constituents may be metallic, polymeric, or a combination of both, or made from any other tough and durable material useful in the present context. The igniter 18 may be formed as known in the art and may be purchased from any known supplier of igniters. The piston ends 22 and 24 may be stamped, extruded, or otherwise formed as will be apparent in the art. Notably, in accordance with the present invention, the piston end 22 combined with the sleeve 34 represents a solution to the concern of energy management, namely by the slidable engagement of the piston rod 26 across the narrowed portion 22c. As shown in FIG. 2, the piston rod 26 actually departs or separates from the widened and first portion 22b as the piston rod assembly 20 is "stretched" to compress the energy management device or sleeve 34. Accordingly, it will be appreciated that the piston rod assembly 20 has a relatively shorter or smaller pre-actuation length L3. Upon actuation of the actuator 10, the piston rod assembly 20 attains a relatively longer or larger post-actuation length L4, as the piston rod 26 slidably engages the outer diameter of portion 22c to crush, compact, and/or deform energy management device or sleeve 34 and thereby "extend" the length of the assembly 20. Not only does the present configuration as described above result in efficient energy management of the piston rod assembly 20 during a "non-load" firing event, but it also presents a packaging advantage. In essence, the package size of the actuator 10 is smaller prior to activation of the actuator 10.

It should further be understood that the preceding is merely a detailed description of various embodiments of this invention and that numerous changes to the disclosed embodiments can be made in accordance with the disclosure herein without departing from the scope of the invention. The preceding description, therefore, is not meant to limit the scope of the invention. Rather, the scope of the invention is to be determined by the various equivalents as would be appreciated by those of ordinary skill in the art.

What is claimed is:

1. An actuator comprising:
   a housing having a first end and a second end;
   a piston rod assembly comprising a piston rod, a first end cap disposed adjacent a first end of the piston rod, and a second end cap disposed adjacent a second end of the piston rod, said piston rod assembly having a pre-actuation length defined from a surface of the first end cap to a surface of the second end cap, wherein prior to actuation, the first end cap and the first end of the piston rod are disposed within the housing and adjacent the first end of the housing; and
   an energy management device disposed about a portion of an outer wall of said first end cap,
   wherein upon actuation of said actuator, the second end cap translates axially in a first direction from the first end of the housing and from the second end of the housing, said energy management device is compressible upon movement of said piston rod axially away from the surface of the first end cap in the first direction, and upon compression of said energy management device, said piston rod assembly has a post-actuation length, defined from the surface of the first end cap to the surface of the second end cap, wherein the post-actuation length is greater than said pre-actuation length, wherein said portion of said outer wall of said first end cap is a second portion having a second outer diameter, and said first end cap comprises a first portion having a first outer diameter and a third portion having a third outer diameter, said energy management device being disposed about the second portion, and said piston rod is crimped about said second portion to form a crimp, and said first and third portions have a greater outer diameter than said second outer diameter, whereby said energy management device is disposed between said crimp and said third portion, and said second portion is axially between the first portion and the third portion.

2. The actuator of claim 1 wherein said energy management device has a pre-operative length greater than a post-operative length of said energy management device.

3. The actuator of claim 1 wherein said energy management device is a deformable sleeve.

4. The actuator of claim 1 wherein said energy management device is loosely disposed about said portion of said outer wall of said first end cap.

5. The actuator of claim 1, wherein said actuator is a pyrotechnic actuator.

6. The actuator of claim 1, wherein said actuator is a hybrid actuator.

7. The actuator of claim 1, wherein said actuator is a pressurized gas actuator.

8. An actuator comprising:
a housing having a first end and a second end;
a piston rod assembly comprising a piston rod, a first end cap disposed adjacent a first end of the piston rod, and a second end cap disposed adjacent a second end of the piston rod, said piston rod assembly having a pre-actuation length defined from a surface of the first end cap to a surface of the second end cap, wherein prior to actuation, the first end cap and the first end of the piston rod are disposed within the housing and adjacent the first end of the housing; and
an energy management device disposed about a portion of an outer wall of said first end cap,
wherein upon actuation of said actuator, the second end cap translates axially in a first direction from the first end of the housing and from the second end of the housing, said energy management device is compressible upon movement of said first end of the piston rod axially away from the surface of the first end cap in the first direction, and upon compression of said energy management device, said piston rod assembly has a post-actuation length, defined from the surface of the first end cap to the surface of the second end cap, wherein the post-actuation length is greater than said pre-actuation length, and
wherein said energy management device is loosely disposed within a plenum defined by the outer wall of the first end cap and an inner wall of the piston rod.

9. The actuator of claim 8, wherein said actuator is a pyrotechnic actuator.

10. The actuator of claim 8, wherein said actuator is a hybrid actuator.

11. The actuator of claim 8, wherein said actuator is a pressurized gas actuator.

* * * * *